(12) United States Patent
Sarrigeorgidis

(10) Patent No.: US 10,466,345 B1
(45) Date of Patent: Nov. 5, 2019

(54) TIME-OF-ARRIVAL ESTIMATION WITH SUBSPACE METHODS

(71) Applicant: Apple Inc., Cupertino, CA (US)

(72) Inventor: Konstantinos Sarrigeorgidis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/912,808

(22) Filed: Mar. 6, 2018

Related U.S. Application Data

(63) Continuation of application No. 15/864,057, filed on Jan. 8, 2018, now abandoned.

(60) Provisional application No. 62/513,624, filed on Jun. 1, 2017.

(51) Int. Cl.
*G01S 11/02* (2010.01)

(52) U.S. Cl.
CPC ..................... *G01S 11/02* (2013.01)

(58) Field of Classification Search
CPC ... G01S 11/02; G01S 1/02; G01S 1/04; G01S 19/22; G01S 5/0215; G01S 5/0236; G01S 3/023; G01S 3/48; G01S 5/14; G01S 11/08; H04B 17/12; H04B 17/21; H04B 1/7093; H04B 2001/6912; H04W 64/00; H04W 84/12; H04W 88/08
See application file for complete search history.

(56) References Cited

U.S. PATENT DOCUMENTS

| | | | |
|---|---|---|---|
| 7,391,368 B1 | 6/2008 | Gao et al. | |
| 8,837,558 B1 * | 9/2014 | Rao | G01S 5/0215 375/152 |
| 2014/0266904 A1 | 9/2014 | Sendonaris et al. | |
| 2014/0266905 A1 * | 9/2014 | Sendonaris | G01S 1/02 342/385 |
| 2016/0113587 A1 * | 4/2016 | Kothe | A61B 5/7203 600/301 |
| 2016/0345286 A1 * | 11/2016 | Jamieson | H04B 17/12 |
| 2017/0012809 A1 | 1/2017 | Lyons | |

OTHER PUBLICATIONS

DOA estimation, Tayem et al, 2005 (Year: 2005).*
D. Santhosh Kumar and V.V. Mani; Time-of-Arrival and Direction-of-Arrival Estimation Techniques for IR-UWB Signals; Journal of Engineering Science and Technology Review 9 (4) (2016) 37-47; Sep. 23, 2016; 11 pages.

* cited by examiner

*Primary Examiner* — Jianxun Yang
(74) *Attorney, Agent, or Firm* — Meyertons Hood Kivlin Kowert and Goetzel PC; Jeffrey C. Hood

(57) ABSTRACT

An interface circuit in an electronic device may receive samples of wireless signals in a time interval, where the wireless signals are associated with the second electronic device. Then, the interface circuit may generate, based at least in part on the samples, pseudospectra corresponding to eigenfilters associated with eigenvectors of a signal spectrum, where the pseudospectra correspond to a set of times of arrival of the samples. Moreover, for a given peak in the pseudospectra, the interface circuit may determine an associated number of additional peaks within a temporal bin that includes the given peak, where the given peak is associated with one of the set of times of arrival. Next, the interface circuit may select a subset of the peaks having a top-N numbers of additional peaks, where N is an integer. Furthermore, the interface circuit may select lower time of arrival for the subset of the peaks.

20 Claims, 10 Drawing Sheets

TIME-OF-ARRIVAL ESTIMATION WITH SUBSPACE METHODS

CROSS REFERENCE TO RELATED APPLICATIONS

This application claims priority under 35 U.S.C. 120 to U.S. Non-Provisional application Ser. No. 15/864,057, "Time-of-Arrival Estimation with Subspace Methods," Konstantinos Sarrigeorgidis, filed on Jan. 8, 2018, and under 35 U.S.C. 119(e) to U.S. Provisional Application Ser. No. 62/513,624, "Time-of-Arrival Estimation with Subspace Methods," by Konstantinos Sarrigeorgidis, filed on Jun. 1, 2017, the contents of both of which are herein incorporated by reference.

FIELD

The described embodiments relate, generally, to wireless communications among electronic devices, and techniques for selecting a time of arrival of wireless signals during the wireless communication.

BACKGROUND

Multipath signals in a wireless environment can result in interference and degraded communication performance. In principle, based on received wireless signals as a function of time and space (in communications systems with spatial diversity), wireless-communication parameters such as the time of arrival can be estimated. For example, a superposition of wireless signals having different time delays in the time domain results in a summation of exponentials in the frequency domain. Consequently, for well-separated frequencies, Fourier techniques can be used to estimate the minimum time of arrival, and thus to identify the wireless signals associated with line-of-sight communication.

In many applications, the frequency or tone separations are close to the Fourier resolution. This often requires the use of so-called 'high-resolution techniques' to identify the wireless signals associated with line-of-sight communication. For example, a covariance matrix based on the wireless signals can be used to deconvolve the wireless signals in a multipath wireless environment, and thus to identify the wireless signals associated with line-of-sight communication.

However, it can be difficult to determine the covariance matrix. In particular, there is often insufficient data available to uniquely determine the covariance matrix. For example, in order to determine the covariance matrix uniquely, multiple instances or repetitions of the wireless signals may need to be acquired. In time-sensitive applications, such repeated measurements are unavailable. Consequently, the determination of the covariance matrix may be underdetermined, which can complicate and confound attempts at identifying the wireless signals associated with line-of-sight communication. In turn, the resulting errors may degrade the communication performance, which is frustrating for users.

SUMMARY

Some embodiments that relate to an electronic device that selects a lower time of arrival is described. This electronic device may include two or more nodes that can be communicatively couple to two or more antennas, and interface circuit that is communicatively couple to two or more nodes and that communicates with the second electronic device. During operation, the interface circuit may receive samples of wireless signals in a time interval, where the wireless signals are associated with the second electronic device. The interface circuit may generate, based at least in part on the samples, pseudospectra corresponding to eigenfilters associated with eigenvectors of a signal spectrum, where the pseudospectra correspond to a set of times of arrival of the samples. Moreover, for a given peak in the pseudospectra, the interface circuit may determine an associated number of additional peaks within a temporal bin that includes the given peak, where the given peak is associated with one of the set of times of arrival. Next, the interface circuit may select a subset of the peaks having a top-N numbers of additional peaks, where N is an integer. Furthermore, the interface circuit may select the lower time of arrival for the subset of the peaks.

Note that the samples may include single instances of one or more multipath signals associated with a number of paths in a wireless environment of the electronic device.

Moreover, the interface circuit may calculate the eigenfilters by performing a Z-transform on the eigenvectors.

Furthermore, the interface circuit may determine a distance between the electronic device and the second electronic device based at least in part on the samples and the selected time of arrival.

Additionally, the set of times of arrival may be based at least in part on a moving-average covariance matrix of channel estimates that are based at least in part on the samples. For example, the moving average may be computed forward and backward in time. Moreover, the eigenvectors may be computed based at least in part on an eigenvalue decomposition of the moving-average covariance matrix. In some embodiments, a given pseudospectrum corresponds to a given eigenvector and is computed based at least in part on multiple signal classification (MUSIC) analysis of the given eigenvector.

Furthermore, the subset may be selected using one of: a feature-selection technique, ridge regression, or a least absolute shrinkage and selection operator (LASSO).

Note that the communication with the second electronic device may involve ultrawide-band communication.

Other embodiments provide an interface circuit in the electronic device.

Other embodiments provide a computer-readable storage medium for use with the interface circuit in the electronic device. When executed by the interface circuit, the computer-readable storage medium may cause the electronic device to perform at least some of the aforementioned operations of the interface circuit in the electronic device.

Other embodiments provide a method for selecting a lower time of arrival. The method includes at least some of the aforementioned operations performed by the interface circuit in the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
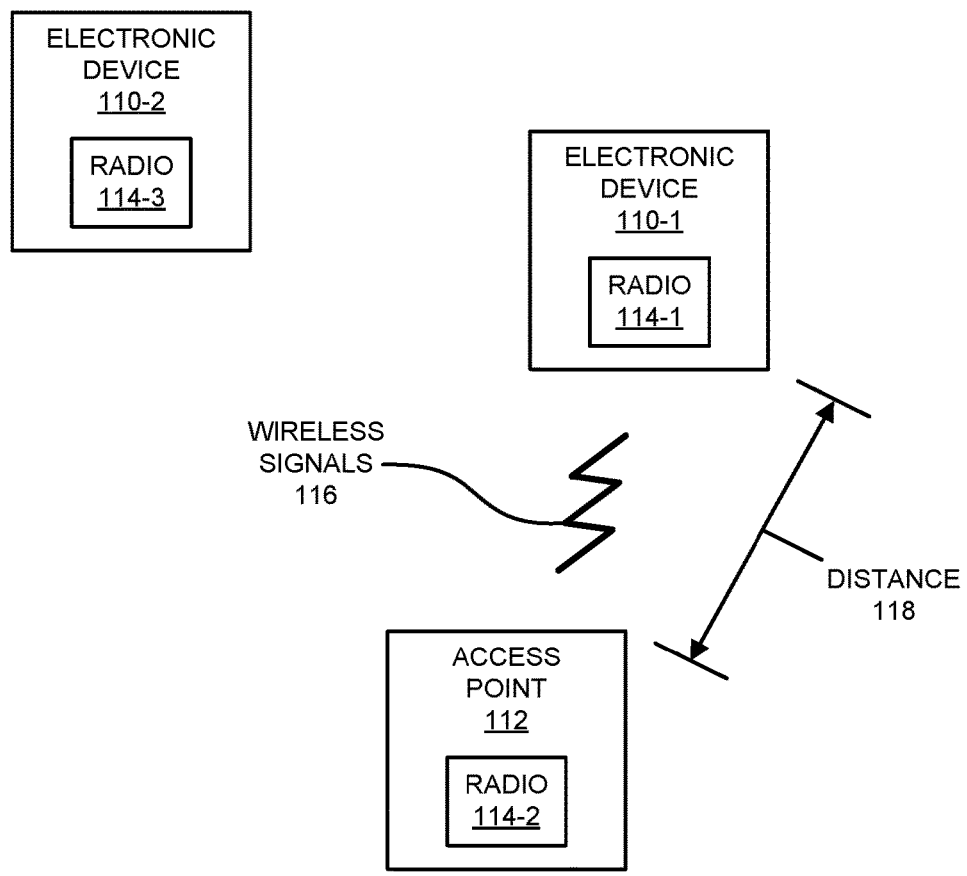
FIG. 1 is a block diagram illustrating an example of electronic devices communicating wirelessly.

An interface circuit in an electronic device may receive samples of wireless signals in a time interval, where the wireless signals are associated with the second electronic device. Then, the interface circuit may generate, based at least in part on the samples, pseudospectra corresponding to eigenfilters associated with eigenvectors of a signal spectrum, where the pseudospectra correspond to a set of times of arrival of the samples. Moreover, for a given peak in the pseudospectra, the interface circuit may determine an associated number of additional peaks within a temporal bin that includes the given peak, where the given peak is associated with one of the set of times of arrival. Next, the interface circuit may select a subset of the peaks having a top-N numbers of additional peaks, where N is an integer. Furthermore, the interface circuit may select a lower time (such as a minimum) of arrival for the subset of the peaks.

By identifying the lower time of arrival, this communication technique may reduce the impact of multipath signals. For example, the communication technique may allow the electronic device to accurately determine the distance between the electronic device and the second electronic device based at least in part on a wireless signal associated with the lower time of arrival. More generally, the communication technique may improve the communication performance by allowing the electronic device to select the lower wireless-communication parameter, such as the time of arrival of the wireless signal, the angle of arrival of the wireless signal, and/or the amplitude of the wireless signal. Consequently, the communication technique may improve the user experience when using the electronic device, and thus may increase customer satisfaction and retention.

Note that the communication technique may be used during wireless communication between electronic devices in accordance with a communication protocol, such as ultrawide band (UWB) protocol or with a wireless ranging technique that has a bandwidth greater than 20 MHz. For example, the communication technique may be used in conjunction with a communication protocol that is compatible with an IEEE 802.11 standard (which is sometimes referred to as Wi-Fi). In some embodiments, the communication technique is used with IEEE 802.11ax, which is used as an illustrative example in the discussion that follows. However, this communication technique may also be used with a wide variety of other communication protocols and/or implementations, and in electronic devices (such as portable electronic devices or mobile devices) that can incorporate multiple different radio access technologies (RATs) to provide connections through different wireless networks that offer different services and/or capabilities.

In particular, an electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' electronic device, 'mobile device,' mobile station, 'wireless station,' 'wireless access point,' 'station,' 'access point' and 'user equipment' (UE) may be used herein to describe one or more consumer electronic devices that may be capable of performing procedures associated with various embodiments of the disclosure.

We now describe the communication technique. FIG. 1 presents a block diagram illustrating an example of electronic devices communicating wirelessly. One or more electronic devices 110 (such as a smartphone, a laptop computer, a notebook computer, a tablet, a wearable, a media device, a smart hub, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual (or 'software') access point that is implemented on a computer or an electronic device.

As described further below with reference to FIG. 10, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. In particular, as illustrated further below with reference to FIGS. 2 and 3, radio 114-1 may receive samples of wireless signals 116 in a time interval, where wireless signals 116 are transmitted by radio 114-2.

Based at least in part on the samples, radio 114-1 may generate pseudospectra corresponding to eigenfilters associated with eigenvectors of a signal spectrum, where the pseudospectra correspond to a set of times of arrival of wireless signals 116. In some embodiments, radio 114-1 calculates the eigenfilters by performing a Z-transform on the eigenvectors.

Moreover, as described further below, the set of times of arrival may be based at least in part on a moving-average covariance matrix of channel estimates that are based at least in part on the samples. For example, the moving average may be computed forward and backward in time. Furthermore, the eigenvectors may be computed based at least in part on an eigenvalue decomposition of the moving-average covariance matrix. In some embodiments, a given pseudospectrum corresponds to a given eigenvector and is computed based at least in part on multiple signal classification (MUSIC) analysis of the given eigenvector. Note that the samples may include single instances or snapshots of one or more multipath signals associated with a number of paths in a wireless environment of electronic devices 110 and access point 112, so that the covariance matrix is underdetermined. Consequently, the covariance matrix may be estimated or approximated.

Additionally, for a given peak in the pseudospectra, radio 114-1 may determine an associated number of additional peaks within a temporal bin that includes the given peak, where the given peak is associated with one of the set of times of arrival. Next, radio 114-1 may select a subset of the peaks having a top-N numbers of additional peaks, where N is an integer. In some embodiments, radio 114-1 selects the subset using: a feature-selection technique, ridge regression, and/or a least absolute shrinkage and selection operator (LASSO).

Then, radio 114-1 may select the lower (such as the minimum) time of arrival for the subset of the peaks.

In some embodiments, radio 114-1 may determine a distance 118 between electronic device 110-1 and access point 112 based at least in part on the samples and the selected time of arrival. More generally, radio 114-1 may determine its distance from another electronic device. For example, a phone can determine its distance from a computer to facilitate unlocking.

In these ways, the communication technique may allow electronic devices 110 and access point 112 to identify wireless signals associated with line-of-sight communication and to accurately determine distance, such as an accuracy of ones, tens, or hundreds of centimeters. These capabilities may improve the user experience when using electronic devices 110. For example, the accurately determined distance may facilitate location-based services and/or other device functions.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA).

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
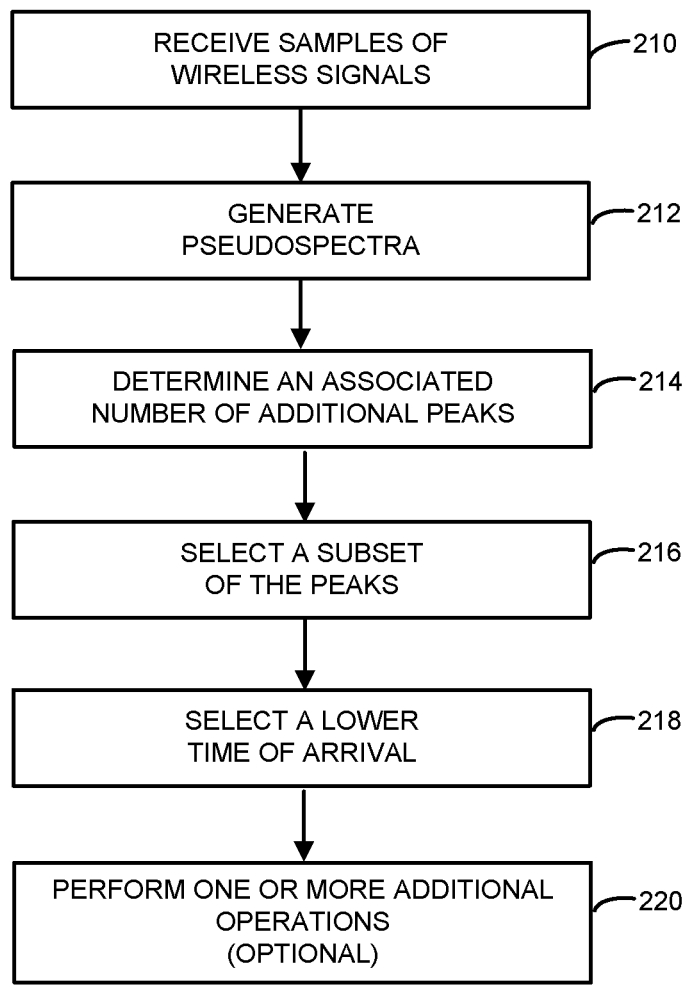
FIG. 2 is a flow diagram illustrating an example of a method for identifying wireless signals associated with a line of sight between an electronic device and a second electronic device using one of the electronic devices in FIG. 1.

FIG. 2 presents a flow diagram illustrating an example method 200 for selecting a lower time of arrival of a wireless signal associated with communication between an electronic device and a second electronic device. This method may be performed by an electronic device, such as an interface circuit in electronic device 110-1 in FIG. 1. During operation, the interface circuit may receive samples of wireless signals (operation 210) in a time interval, where the wireless signals are associated with the second electronic device. Note that the samples may include single instances of one or more multipath signals associated with a number of paths in a wireless environment of the electronic device.

Then, the interface circuit may generate, based at least in part on the samples, pseudospectra (operation 212) corresponding to eigenfilters associated with eigenvectors of a signal spectrum, where the pseudospectra correspond to a set of times of arrival of the samples.

For example, the set of times of arrival may be based at least in part on a moving-average covariance matrix of channel estimates that are based at least in part on the samples. Moreover, the moving average may be computed forward and backward in time. Furthermore, the eigenvectors may be computed based at least in part on an eigenvalue decomposition of the moving-average covariance matrix. Additionally, the interface circuit may calculate the eigenfilters by performing a Z-transform on the eigenvectors. In some embodiments, a given pseudospectrum corresponds to a given eigenvector and is computed based at least in part on MUSIC analysis of the given eigenvector.

Moreover, for a given peak in the pseudospectra, the interface circuit may determine an associated number of additional peaks (operation 214) within a temporal bin that includes the given peak, where the given peak is associated with one of the set of times of arrival.

Next, the interface circuit may select a subset of the peaks (operation 216) having a top-N numbers of additional peaks, where N is an integer. For example, the subset may be selected using: a feature-selection technique, ridge regression, and/or LASSO.

Furthermore, the interface circuit may select the lower time of arrival (operation 218) for the subset of the peaks.

In some embodiments, the interface circuit optionally performs one or more additional operations (operation 220). For example, the interface circuit may determine a distance between the electronic device and the second electronic device based at least in part on the samples and the selected time of arrival.

In some embodiments of method 200, there may be additional or fewer operations. Moreover, the order of the operations may be changed, and/or two or more operations may be combined into a single operation.

In some embodiments, at least some of the operations in method 200 is performed by an interface circuit in the electronic device. For example, at least some of the operations may be performed by firmware executed by an interface circuit, such as firmware associated with a MAC layer, as well as one or more circuits in a physical layer in the interface circuit.

Figure 3:
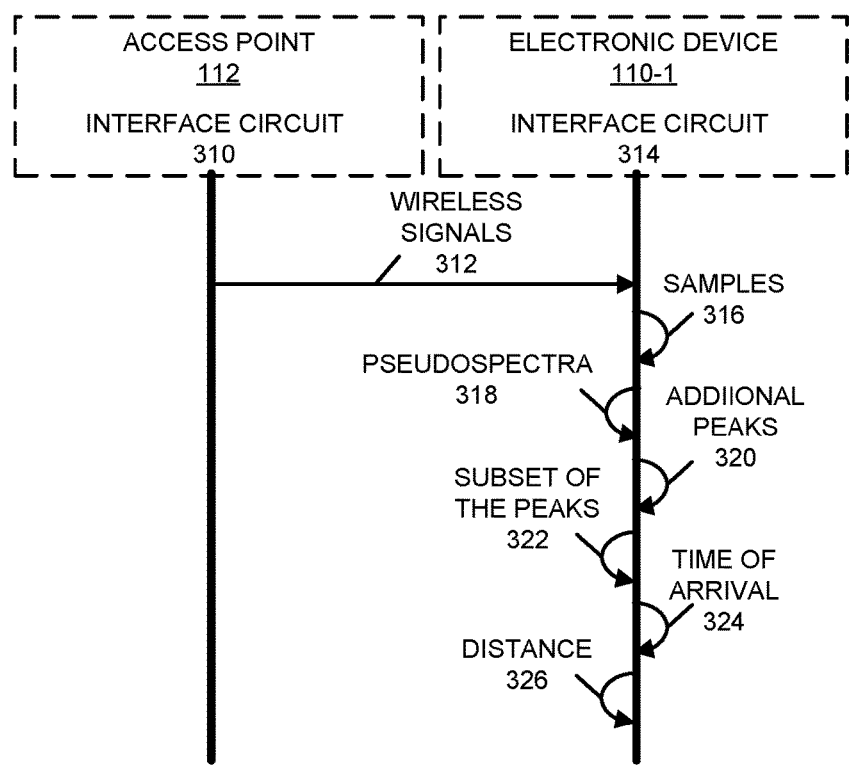
FIG. 3 is a flow diagram illustrating an example of communication between electronic devices, such as the electronic devices of FIG. 1.

The communication technique is further illustrated in FIG. 3, which presents a flow diagram illustrating an example of communication between electronic device 110-1 and access point 112. In particular, interface circuit 310 in access point 112 may transmit wireless signals 312 to electronic device 110-1. Then, interface circuit 314 in electronic device 110-1 may receive samples 316 of wireless signals 312 in a time interval.

Then, interface circuit 314 may generate, based at least in part on the samples, pseudospectra 318 corresponding to eigenfilters associated with eigenvectors of a signal spectrum, where the pseudospectra correspond to a set of times of arrival of the samples. For example, the set of times of arrival may be based at least in part on a moving-average covariance matrix of channel estimates that are based at least in part on samples 316. Moreover, the moving average may be computed forward and backward in time. Furthermore, the eigenvectors may be computed based at least in part on an eigenvalue decomposition of the moving-average covariance matrix. Additionally, interface circuit 314 may calculate the eigenfilters by performing a Z-transform on the eigenvectors. In some embodiments, a given pseudospectrum corresponds to a given eigenvector and is computed based at least in part on MUSIC analysis of the given eigenvector.

Moreover, for a given peak in the pseudospectra, interface circuit 314 may determine an associated number of additional peaks 320 within a temporal bin that includes the given peak, where the given peak is associated with one of the set of times of arrival.

Next, interface circuit 314 may select a subset of the peaks 322 having a top-N numbers of additional peaks, where N is an integer. For example, subset 322 may be selected using: a feature-selection technique, ridge regression, and/or LASSO.

Furthermore, interface circuit 314 may select a lower time of arrival 324 for the subset of the peaks 322.

In some embodiments, interface circuit 314 can optionally determine a distance 326 between electronic device 110-1 and access point 112 based at least in part on samples 316 and the selected time of arrival 324.

Representative Embodiments

We now describe embodiments of the communication technique. This communication technique may perform false-peak mitigation for MUSIC-based time-of-arrival estimation using a feature-selection technique, such as LASSO. Moreover, the communication technique may improve the accuracy of distance determination using ultrawide-band communication.

Figure 4:
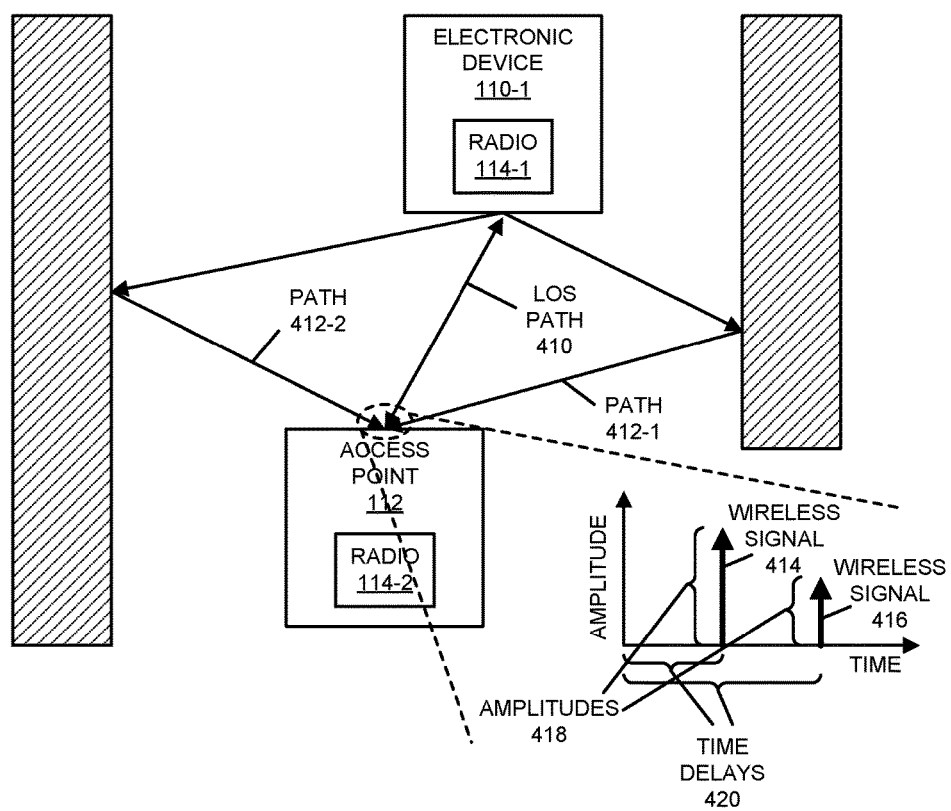
FIG. 4 is a drawing illustrating example communication between electronic devices, such as the electronic devices of FIG. 1.

FIG. 4 presents a drawing illustrating a communication between electronic devices, such as electronic device 110-1 and access point 112 in FIG. 1. In FIG. 4, there are multiple paths between electronic device 110-1 and access point 112, including a line-of-sight (LOS) path 410 that results in a direct wireless signal 414, and additional paths 412 that give rise to multi-path wireless signals (such as wireless signal 416). As shown in the inset, which illustrates the received wireless signals at electronic device 110-1, wireless signals 414 and 416 have associated amplitudes 418 and time delays 420. However, it can be difficult to distinguish or separate wireless signal 414 from wireless signals 416.

Figure 5:
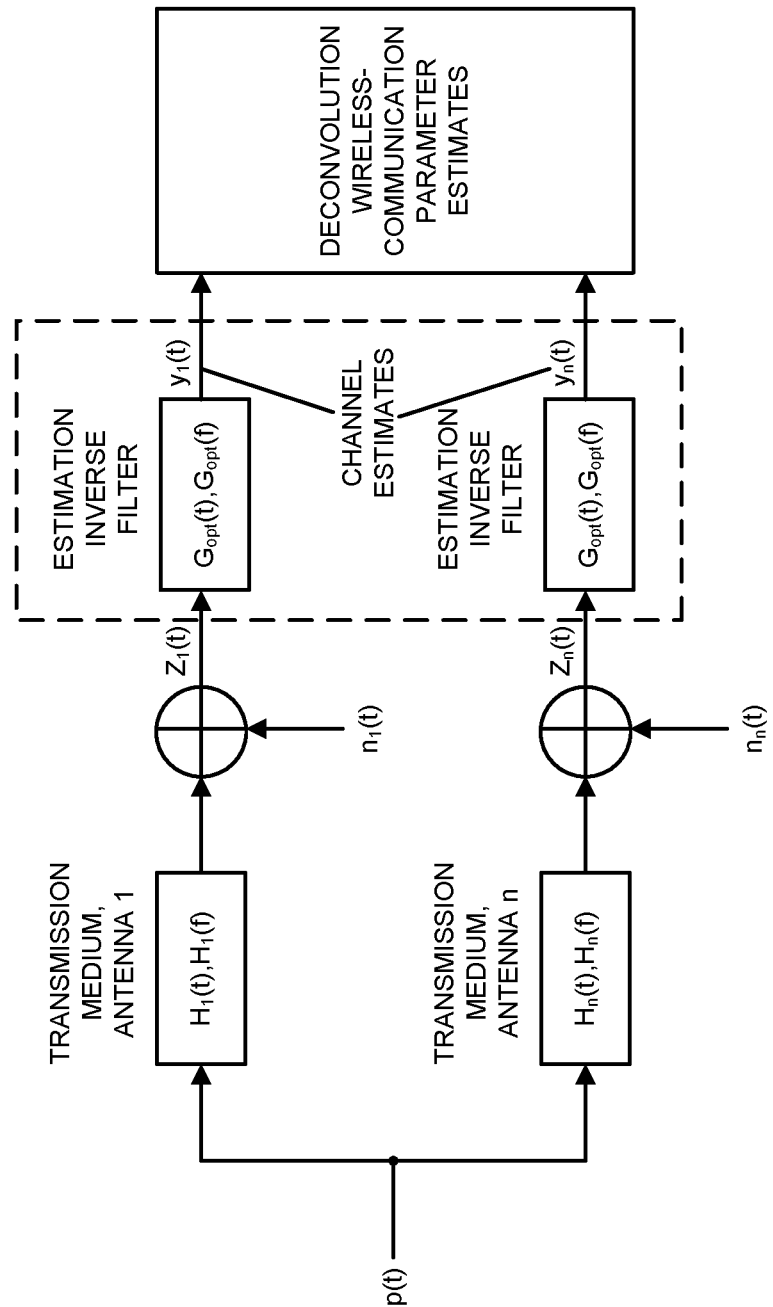
FIG. 5 is a drawing illustrating example communication between electronic devices, such as the electronic devices of FIG. 1.

FIG. 5 presents a drawing illustrating a communication between electronic devices, such as electronic device 110-1 and access point 112 in FIG. 1. In FIG. 5, a modulating waveform p(t) is transmitted by N antennas in a transmitting electronic device through paths having channel impulse responses $h_i(t)$ in the time domain (where i is an integer between 1 and N) and $H_i(f)$ in the frequency domain. In addition, additive noise $n_i(t)$ corrupts the transmitted wireless signals.

Samples, $z_i(t)$, of the wireless signals are received by N antennas or sensors in a receiving electronic device. These samples are passed through a set of estimation inverse filters having impulse responses $g_{opt}(t)$ or, equivalently, $G_{opt}(f)$. Then, the resulting channel estimates (which, in principle, include multiple direct and multipath signals) are deconvolved to determine time-of-arrival (TOA) and distance-of-arrival (DOA) estimates. Note that the estimation inverse filters provide minimum mean square error (MMSE)-type estimates of a segment of the aggregate impulse response. In general, for a high SNR of, e.g., 30 dB, inverse filters may be used, while for a low SNR of, e.g., 15 dB, a matched filter may be used. Moreover, as described further below, the deconvolution may employ a high-resolution deconvolution technique to solve for individual path delays, so that the first or lower path delay can be selected.

Thus, given the received wireless signals as a function of time and space (in electronic devices with spatial diversity, e.g., multiple antennas), wireless-communication parameters associated with a first or line-of-sight path may be estimated, such as one or more of: the loss of signal, the time of flight, the direction of arrival (DOA), etc.

Because the channel transfer function may be unknown, $G_{opt}(f)$ may be the inverse of the pulse shape or the modulating waveform in the frequency domain, P(f), i.e., $$G_{opt}(f) = \frac{1}{P(f)}.$$

Moreover, the superposition of time domain delays associated with different paths results in a summation of exponentials in the frequency domain. For well-separated frequencies, a Fourier technique (such as an FFT or a DFT) allows the wireless signals associated with different paths to be estimated. However, as noted previously, when the tone separation is closely spaced (e.g., when the tone separation is close to Fourier resolution), a high-resolution technique may be used, such as one based at least in part on the covariance matrix (e.g., MUSIC, maximum likelihood, etc.).

Let the number of instances or snapshots (i.e., independent data) be Q, the number of paths be M, and the FFT size be N. Then the channel model can be expressed as $$y_n(q) = x_n(q) + v_n(q)$$

where $$n = -\frac{N-1}{2}, \ldots, \frac{N-1}{2},$$

$$x_n(q) = \sum_{m=1}^{M} g_m(q) \cdot e^{jn\omega_m},$$

$$w_m = \frac{2\pi \tau_m F_s}{N},$$

M is less than N, and n is a frequency-domain index. Note that q (which is sometimes indicated as θ) indicates a wireless-communication parameter, such as the time delay or the time of arrival.

Alternatively, in the frequency domain, the model can be expressed as $$Y(q) = X(q) + V(q)$$

or $$Y(q) = S \cdot H(q) + V(q)$$

where $$S = [S_1, S_2, \ldots, S_M].$$

Furthermore, $$S_m = z_m^{-(N-1)/2}[1, z_m, \ldots, z_m^{N-1}]^T.$$

where $z_m = \exp(j\omega_m)$, and $$H(q) = [H_1(q), H_2(q), \ldots, H_M(q)]^T.$$

As noted previously, eigenvalue decomposition can be used for frequency estimation. The data covariance matrix is given by $$R_Y = \frac{1}{Q} \sum_{q=1}^{Q} Y(q) Y(q)^H = SPS^H$$

and the signal covariance matrix is given by $$P = \frac{1}{Q} \sum_{q=1}^{Q} G(q)G(q)^H.$$

During eigenvalue decomposition, the signal subspace may be estimated in a first operation. Then, in a second operation, the frequencies may be estimated from the estimated signal subspace (and the noise subspace). Estimating the signal may rely on the hypothesis that the signal manifold $\{X(q)\}$ spans the whole signal subspace. In this case, Rx has M nonzero signal eigenvalues.

If the condition on $\{X(q)\}$ is not specified, the rank of Rx is less than M (the minimal requirement) and some additional information has to be used in order to estimate the covariance matrix, such as a moving average or smoothing. Note that this is true when Q is less than M (e.g., when Q equals one).

Estimating the frequencies may rely on the orthogonality, to all the signal vectors, of any vector E in the noise subspace, i.e., $\nabla E \in$ noise subspace, $S_m{}^H E=0$. Thus, the frequencies may be estimated based at least in part on the intersection of the array manifold or projection. For example, as discussed further below, the inverse of the intersection of the array manifold or projection may include a series of peaks. Equivalently, a discriminating function can be defined as $$f_E(\omega) = S(z)^H E,$$

where $z = \exp(j\omega)$.

During the first preprocessing operation, a moving average (such as a forward-moving average) may be computed. For example, when the number of instances or snapshots Q is less than M, then the signal manifold given by $\{X(q)\}$ may no longer span the signal subspace. In order to extend the rank of the signal manifold to M, the shift invariant property of the complex exponentials may be used. Consider sub-vectors of length L (such as 24 or 32 sub-vectors), formed from a large vector (of length N). The number of such sub-vectors is K, which equals N−L+1. These sub-vectors are L adjacent and centered at index k, i.e., $$Y_k(q) = (y_{k-(L-1/2)}(q), y_k(q), y_{k+1}(q), \ldots, y_{k+(L-1/2)}(q))^T.$$

Alternatively, the sub-vectors equal $X_k(q) + V_k(q)$. Note that the range of k is $$-\frac{K-1}{2} \leq k \leq \frac{K-1}{2},$$

where K equals N−L+1.

The number of vectors in the subset $\{X(q)\}$ is now K·Q. Decorrelation of the channel gains can be achieved by computing a new, moving-averaged covariance matrix $$R_Y^B = \frac{1}{K \cdot Q} \sum_{q=1}^{Q} \sum_{k=-(K-1/2)}^{K-1/2} Y_k(q) Y_k(q)^H.$$

Similarly, in some embodiments this approach may be enhanced by using a forward-backward moving average (smoothing) when Q is less than M. From $$S_m = z_m^{-(N-1)/2} [1, z_m, \ldots, z_m^{N-1}]^T,$$

it can be seen that the signals vectors are Hermitian symmetric. That is, if the components of $S_m$ are order-reversed and conjugated, then $S_m$ remains invariant. This operation can be applied to the sub-vector responses $X_k(q)$ to obtain the reversed-conjugated sub-vector $\hat{X}_k(q)$. Moreover, the final estimate of the covariance matrix, combining the forward and backward operations can be expressed as $$\hat{R}_Y^{FB} = \frac{1}{K \cdot Q} \sum_{q=1}^{Q} \sum_{k=-(K-1/2)}^{K-1/2} \left( Y_k(q) Y_k(q)^H + \hat{Y}_k(q) \hat{Y}_k(q)^H \right).$$

Eigenvalue decomposition may be applied to this estimated covariance matrix. First, the signal and the noise subspace may be estimated. Then, a 'spectral representation' of the signal may be obtained by plotting $f_E(\omega)^{-2}$. This spectral representation is sometimes referred to as MUSIC. Thus, $R_Y$ is used to determine $R_Y^B$, which is then used to determine $\hat{R}_Y^{FB}$.

Figure 6:
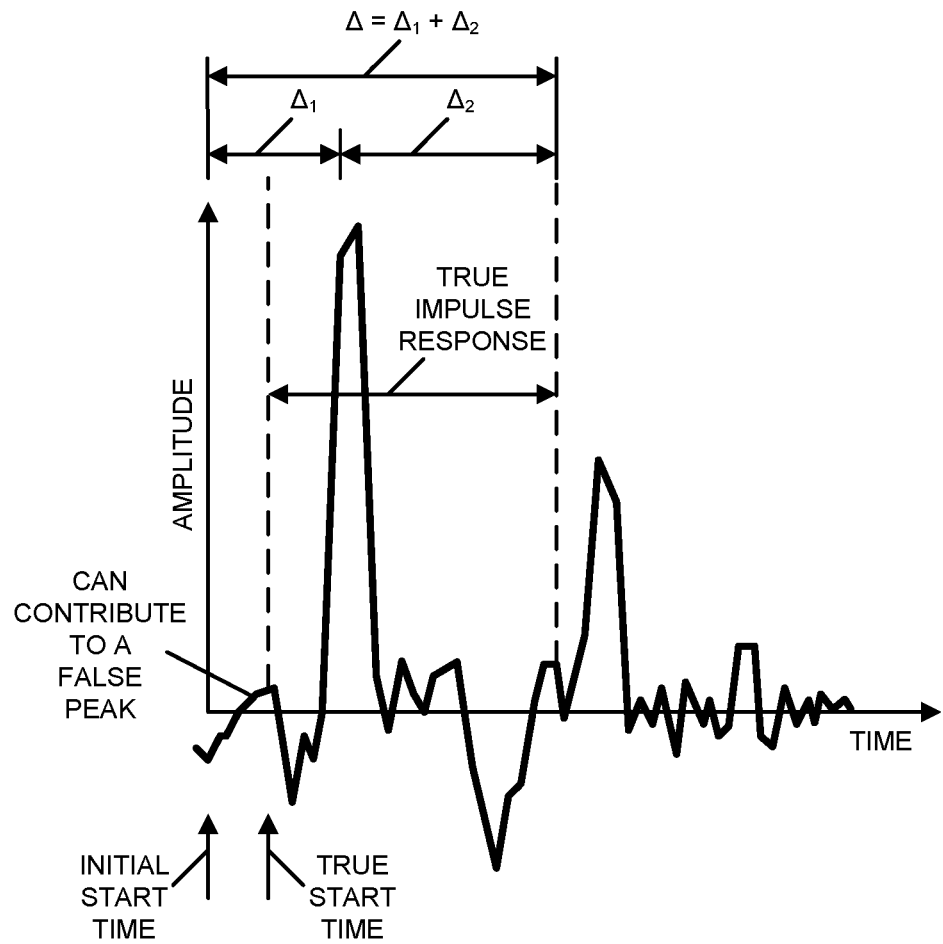
FIG. 6 is a drawing illustrating example wireless signals during communication between electronic devices, such as the electronic devices of FIG. 1.

As shown in FIG. 6, which presents a drawing illustrating wireless signals during communication between electronic devices 110 in FIG. 1, the processing window includes the composite channel impulse response and false peaks. The wireless-communication parameter(s) (such as the time of arrival or the direction of arrival) may be estimated using a window or time interval of data of length Δ. For example, the time interval may be 25 ns. More generally, the time interval may be less than 100 ns. Note that the data may have been averaged and may de-spread (in the presence of a spreading code).

In FIG. 6, Δ equals $\Delta_1$ plus $\Delta_2$. $\Delta_1$ is the time interval between an initial guess at the start time and the true (initially unknown) start time. For example, $\Delta_1$ may be 4 ns. This means that the initial start time may be approximately four samples before the true start time. Note that peaks during $\Delta_1$ can contribute to a false peak during the MUSIC analysis. In general, as $\Delta_1$ increases, the number of false peaks increased. Moreover, $\Delta_2$ is a time interval that determines the length of the true impulse response.

Figure 7:
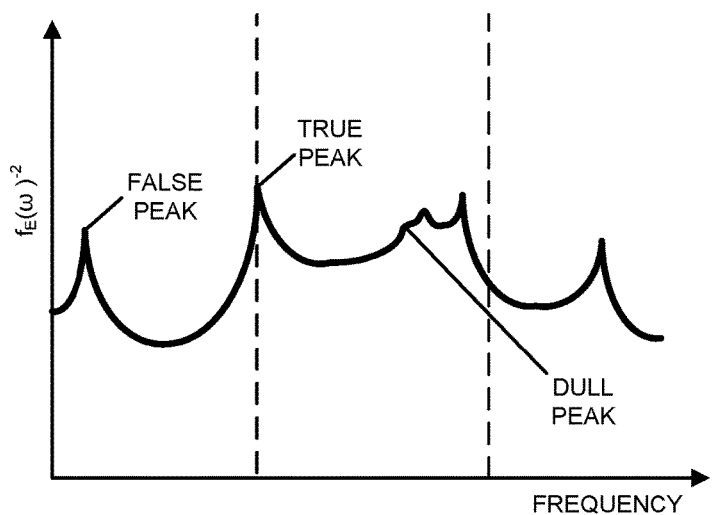
FIG. 7 is a drawing illustrating an example of identification of wireless signals associated with a line of sight between an electronic device and a second electronic device, such as the electronic devices of FIG. 1.

FIG. 7 presents a drawing illustrating identification of wireless signals associated with a line of sight between an electronic device and a second electronic device, such as the electronic devices of FIG. 1. FIG. 7 illustrates $f_E(\omega)^{-2}$. Note that, in addition, to true peaks, there can be false peaks and dull peaks. A dull peak can be missed if there is not a significant drop or decrease proximate to the peak. Moreover, a false peak can be incorrectly selected as being associated with the line-of-sight wireless signal, which can result in errors in the determination of the wireless-communication parameter (such as the time of arrival). Consequently, false peaks can significantly degrade the communication performance.

In order to address this challenge, MUSIC analysis may be used to determine the time of arrival. In the communication technique, note that M is unknown. During the communication technique, preprocessing (e.g., the moving average) may be performed and then eigenvalue decomposition may be performed on the smoothed covariance matrix. Next, for each of the eigenfilters, the pseudospectrum may be determined and the peaks per eigenfilter may be determined. Moreover, binning may be performed on the determined peaks, and the average peak per bin may be calculated. Based at least in part on the cardinality per bin, the bins may be sorted. For the first P sorted peaks or delays (where P is a parameter, such as an integer, e.g., 4, 8, 16, etc.), some of the delays may be due to signal path or may be noise or a false peak. Consequently, a subset selection or a shrinkage technique (such as LASSO) may be performed to select the best delays or variables out of P (i.e., to perform variable selection). Furthermore, based at least in part on the best identified model, the first variable or delay may be selected as the time of arrival. In some embodiments, these operations are iteratively repeated, so that the time of arrival is further identified using maximum likelihood.

During the eigenvalue decomposition and the individual eigenfilter processing, the subarray size may have length N and the number of sources (or paths) M is unknown. The Z-transform of the $i^{th}$ noise subspace eigenfilter (the $i^{th}$ vector of the noise subspace) is $$V_i^N(z) = \sum_{k=0}^{N-1} v_i^M(k) z^{-k},$$

where i equals M+1, . . . , N. Note that for each subspace eigenfilter, this equation will have N−1 roots. Ideally, M of these roots are on the unit circle. However, the remaining N−M−1 zeros may lie anywhere. In the unfortunate cases where these zeros lie close to the unit circle, they will give rise to spurious peaks.

In general, there the noise subspace eigenfilters tend to give rise to spurious peaks that occur on different frequencies. This observation can be extended to examine a subspace eigenfilter with different subarray lengths N, such as $$V_i^{N_l}(z) = \sum_{k=0}^{N_l-1} v_i^{N_l}(k) z^{-k},$$

where i equals 1, . . . $M_1$ and l equals 1, p. If N is changed, the spurious peaks may also appear to be random, but the true peaks should appear consistently. Consequently, a majority rule may be design based at least in part on this observation.

Because M is unknown, in some embodiments M is set to one, i.e., it is assumed that there is at least one path, and that N is a parameter.

Figure 8:
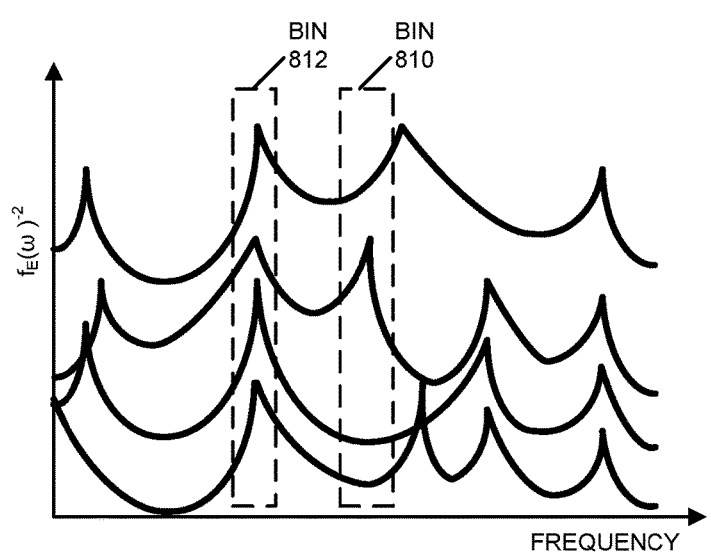
FIG. 8 is a drawing illustrating example wireless signals during communication between electronic devices, such as the electronic devices of FIG. 1.

The pseudospectrum per eigenfilter and peak binning is shown in FIG. 8, which presents a drawing illustrating wireless signals during communication between electronic devices, such as the electronic devices of FIG. 1. In FIG. 8, M equals 4. Note that bins with low cardinality (such as bin 810) have fewer peaks than bins with high cardinality (such as bin 812).

During the variable/feature selection, there are P hypothesized peaks or path delays from MUSIC analysis of the individual eigenfilters. A linear regression model is used, i.e., $$\left| Y(f) - P(f) \cdot \sum_{m=1}^{M} g_m e^{-j2\pi \tau_m f} \right|^2.$$

Given Y, P, and the variables $\tau_m$, feature or variable selection is performed to exclude irrelevant variables from the variable-selection model. This operation is intended to remove the false peaks.

In principle, there are several possibilities. For example, in subset selection, the best model that incorporates a subset of the P variables or predictors that is believed to be related with the response is identified. Alternatively, in shrinkage, a model involving all P predictors is fit. However, the estimated coefficients can be shrunken to zero (regularization). If the shrinkage uses L1 optimization (LASSO), some of the coefficients may be estimated to be exactly zero, thereby providing feature selection or model interpretability.

During subset selection, the best subset is selected. For example, successively models may be constructed where the best k (out of P) predictors are chosen for the construction of the model. The number of models tested for the $k^{th}$ model is (p k). Note that the criterion for choosing the best subset is the residual sum of squares (RSS).

After the P+1 models are constructed, the best model may be identified using cross-validation techniques, or Cp, AIC, BIC criteria.

Note that the preceding models have been derived based at least in part on the training data Y. Therefore, the models containing more predictors will always have the smallest training RSS (possibly due to overfitting). However, the model with the lowest test error is the one that is desired (in order to avoid overfitting). In order to determine the best model with the lowest test error, the test error may be indirectly estimated by performing an adjustment to the training error to account for the overfitting (Cp, AIC, BIC). For example, $$C_p(k) = \frac{1}{n}(RSS(k) + 2k\hat{\sigma}^2),$$

where $\hat{\sigma}^2$ is the noise variance. The penalty increases as the number of predictors in the model increases. This may adjust for the decreased training error.

Figure 9:
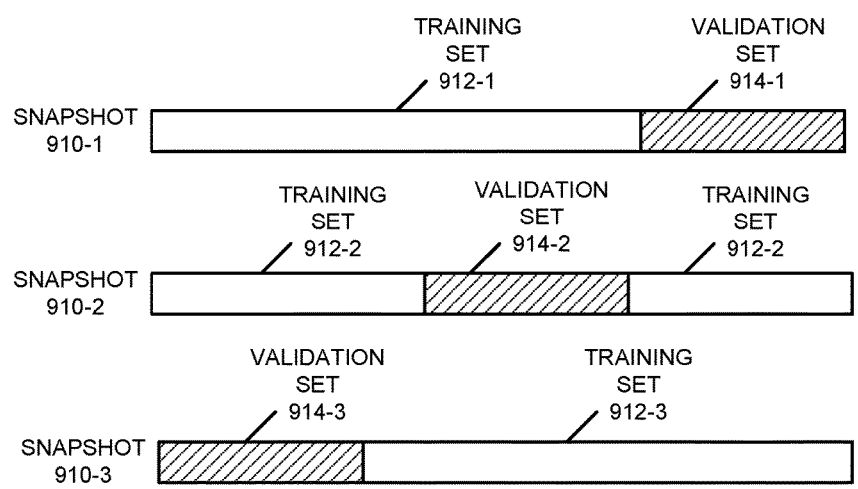
FIG. 9 is a drawing illustrating an example pseudo spectrum associated with wireless signals during communication between electronic devices, such as the electronic devices of FIG. 1.

Alternatively or additionally, in some embodiments the subset selection involves cross-validation. As shown in FIG. 9, which presents a drawing illustrating a pseudo spectrum associated with wireless signals during communication between electronic devices, such as the electronic devices of FIG. 1, the test error can be directly estimated using a validation set approach (or cross-validation) and then the model for which the estimated test error is the smallest can be selected. In FIG. 9, the validation set approach may be used, with a training set and a validation set for test error. In the case of multiple snapshots 910 (assuming that the time delays are constant or time invariant), there may be multiple training sets 912 and validation sets 914. Moreover, in some embodiments, k-fold cross-validation is used. For example, let k equal 10. Then, k−1 equal to nine segments may be used for training, and one segment may be used for testing. These operations may be repeated by repeatedly assigning a different validation segment. Note that the $k^{th}$ cross-validation is $$CV_k = \frac{1}{k} \sum_{1}^{k} MSE_i$$

and the mean-square error is $$MSE = \frac{RSS}{n}.$$

As noted previously, in some embodiments the selection involves the use of a shrinkage technique, such as ridge regression or LASSO. LASSO solves the following problem $$\min_\beta \left\{ \sum_{i=1}^n \left( y_i - \beta_0 - \sum_{j=1}^p \beta_j S_{ij} \right)^2 \right\}$$

subject to $$\sum_{j=1}^p |\beta_j| \le s,$$

and ridge regression solves $$\min_\beta \left\{ \sum_{i=1}^n \left( y_i - \beta_0 - \sum_{j=1}^p \beta_j S_{ij} \right)^2 \right\}$$

subject to $$\sum_{j=1}^p \beta_j^2 \le s.$$

For comparison, the best subset selection solves the following problem $$\min_\beta \left\{ \sum_{i=1}^n \left( y_i - \beta_0 - \sum_{j=1}^p \beta_j S_{ij} \right)^2 \right\}$$

subject to $$\sum_{j=1}^p I(\beta_j \ne 0) \le s.$$

This amounts to finding the set of coefficients that make the LS error as small as possible, subject to the constraint that no more than s coefficients can be nonzero. Depending on the value of P, the best selection can be computationally intensive (but for time of arrival may be possible).

Note that LASSO is a more computationally feasible alternative for best feature selection that involves a convex optimization problem. Moreover, in soft thresholding, LASSO more or less shrinks all coefficients towards zero and sufficiently small (false peaks) coefficients all the way to zero.

In the shrinkage techniques, the tuning parameter (Lambda) needs to be selected. For example, just as the subset selection requires a final step to determine which of the models under consideration is best, LASSO also requires selecting the 'budget' parameter s as $$\sum_{j=1}^p |\beta_j| \le s.$$

In some embodiments, cross-validation is used for this purpose. For example, a grid of s values may be chosen. For each of the values, the LASSO problem may be solved using the training data, and the test error MSE may be obtained from the validation set. For the k-fold cross-validation, this procedure is repeated for k times to find the cross-validation test error. Then, select that s value that results in the best fit as described by the test error. Moreover, using this optimum value of s, the model may be re-fit using all the observations.

Note that, in the case of true paths/delays, the variables used to fit the model may be called 'signal variables,' and the false peaks may be called 'noise variables.' Moreover, LASSO and cross-validation may select that tuning parameter for which only the signal variables are non-zero.

In a simulation with an SNR of −15 dB, 2000 channels, Δ of 25 ns, a bandwidth of 375 MHz, N equal to three, and 256-bit FFT, the communication technique may be used to estimate distance. For example, after identifying the lower time of arrival and, thus, the associated line-of-sight wireless signal, the distance can be determined with an accuracy of: 3.9 cm 68% of the time, 10.2 cm 11% of the time, 20 cm 4.9% of the time, and 100.3 cm 0.6% of the time.

Note that by allowing the number of snapshots or instances Q to be less than M, the communication technique may provide fast convergence. In addition, the communication technique may be used in dynamic wireless environments, where the time of arrival is time variant, which may prevent the use of multiple snapshots or instances of the measured wireless samples.

We now describe embodiments of an electronic device. FIG. 10 presents a block diagram of an electronic device 1000 (which may be a cellular telephone, an access point, another electronic device, etc.) in accordance with some embodiments. This electronic device includes processing subsystem 1010, memory subsystem 1012, and networking subsystem 1014. Processing subsystem 1010 includes one or more devices configured to perform computational operations. For example, processing subsystem 1010 can include one or more microprocessors, application-specific integrated circuits (ASICs), microcontrollers, programmable-logic devices, and/or one or more digital signal processors (DSPs).

Memory subsystem 1012 includes one or more devices for storing data and/or instructions for processing subsystem 1010 and networking subsystem 1014. For example, memory subsystem 1012 can include dynamic random access memory (DRAM), static random access memory (SRAM), a read-only memory (ROM), flash memory, and/or other types of memory. In some embodiments, instructions for processing subsystem 1010 in memory subsystem 1012 include: one or more program modules or sets of instructions (such as program module 1022 or operating system 1024), which may be executed by processing subsystem 1010. For example, a ROM can store programs, utilities or processes to be executed in a non-volatile manner, and DRAM can provide volatile data storage, and may store instructions related to the operation of electronic device 1000. Note that the one or more computer programs may constitute a computer-program mechanism, a computer-readable storage medium or software. Moreover, instructions in the various modules in memory subsystem 1012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1010. In some embodiments, the one or more computer programs are distributed over a network-coupled computer system so that the one or more computer programs are stored and executed in a distributed manner.

In addition, memory subsystem 1012 can include mechanisms for controlling access to the memory. In some embodiments, memory subsystem 1012 includes a memory hierarchy that comprises one or more caches coupled to a memory in electronic device 1000. In some of these embodiments, one or more of the caches is located in processing subsystem 1010.

In some embodiments, memory subsystem 1012 is coupled to one or more high-capacity mass-storage devices (not shown). For example, memory subsystem 1012 can be coupled to a magnetic or optical drive, a solid-state drive, or another type of mass-storage device. In these embodiments, memory subsystem 1012 can be used by electronic device 1000 as fast-access storage for often-used data, while the mass-storage device is used to store less frequently used data.

Figure 10:
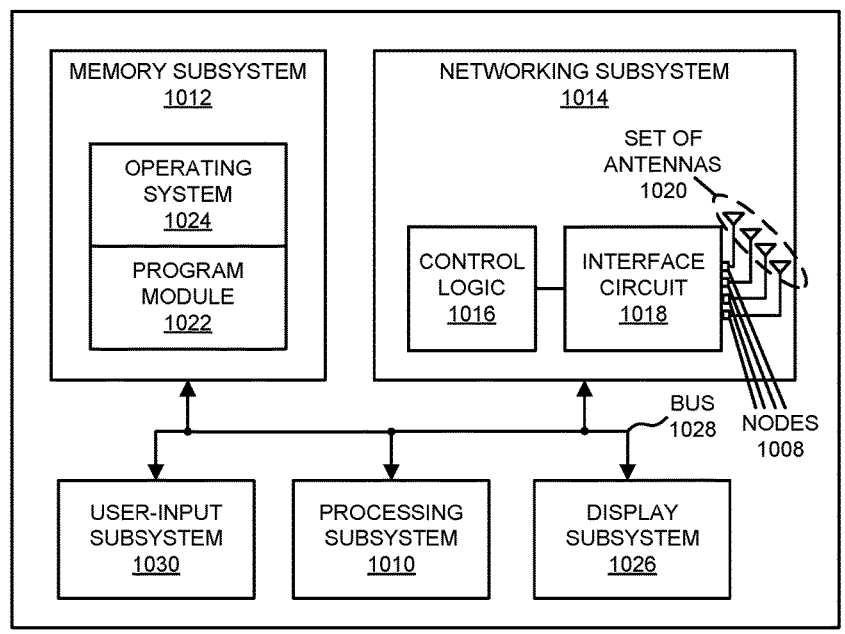
FIG. 10 is a block diagram illustrating an example of one of the electronic devices of FIG. 1.

Networking subsystem 1014 includes one or more devices configured to couple to and communicate on a wired and/or wireless network (i.e., to perform network operations), including: control logic 1016, an interface circuit 1018 and a set of antennas 1020 (or antenna elements) in an adaptive array that can be selectively turned on and/or off by control logic 1016 to create a variety of optional antenna patterns or 'beam patterns.' (While FIG. 10 includes set of antennas 1020, in some embodiments electronic device 1000 includes one or more nodes, such as nodes 1008, e.g., a pad, which can be coupled to set of antennas 1020. Thus, electronic device 1000 may or may not include set of antennas 1020.) For example, networking subsystem 1014 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1000 may use the mechanisms in networking subsystem 1014 for performing simple wireless communication between the electronic devices, e.g., transmitting advertising or beacon frames and/or scanning for advertising frames transmitted by other electronic devices.

Within electronic device 1000, processing subsystem 1010, memory subsystem 1012, and networking subsystem 1014 are coupled together using bus 1028 that facilitates data transfer between these components. Bus 1028 may include an electrical, optical, and/or electro-optical connection that the subsystems can use to communicate commands and data among one another. Although only one bus 1028 is shown for clarity, different embodiments can include a different number or configuration of electrical, optical, and/or electro-optical connections among the sub systems.

In some embodiments, electronic device 1000 includes a display subsystem 1026 for displaying information on a display, which may include a display driver and the display, such as a liquid-crystal display, a multi-touch touchscreen, etc. Display subsystem 1026 may be controlled by processing subsystem 1010 to display information to a user (e.g., information relating to incoming, outgoing, or an active communication session).

Electronic device 1000 can also include a user-input subsystem 1030 that allows a user of the electronic device 1000 to interact with electronic device 1000. For example, user-input subsystem 1030 can take a variety of forms, such as: a button, keypad, dial, touch screen, audio input interface, visual/image capture input interface, input in the form of sensor data, etc.

Electronic device 1000 can be (or can be included in) any electronic device with at least one network interface. For example, electronic device 1000 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1000, in alternative embodiments, different components and/or subsystems may be present in electronic device 1000. For example, electronic device 1000 may include one or more additional processing subsystems, memory subsystems, networking subsystems, and/or display subsystems. Additionally, one or more of the subsystems may not be present in electronic device 1000. Moreover, in some embodiments, electronic device 1000 may include one or more additional subsystems that are not shown in FIG. 10. Also, although separate subsystems are shown in FIG. 10, in some embodiments some or all of a given subsystem or component can be integrated into one or more of the other subsystems or component(s) in electronic device 1000. For example, in some embodiments program module 1022 is included in operating system 1024 and/or control logic 1016 is included in interface circuit 1018.

Moreover, the circuits and components in electronic device 1000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1014. This integrated circuit may include hardware and/or software mechanisms that are used for transmitting wireless signals from electronic device 1000 and receiving signals at electronic device 1000 from other electronic devices. Aside from the mechanisms herein described, radios are generally known in the art and hence are not described in detail. In general, networking subsystem 1014 and/or the integrated circuit can include any number of radios. Note that the radios in multiple-radio embodiments function in a similar way to the described single-radio embodiments.

In some embodiments, networking subsystem 1014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1022, operating system 1024 (such as a driver for interface circuit 1018) or in firmware in interface circuit 1018. Alternatively or additionally, at least some of the operations in the communication technique may be implemented in a physical layer, such as hardware in interface circuit 1018. In some embodiments, the communication technique is implemented, at least in part, in a MAC layer and/or in a physical layer in interface circuit 1018.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   two or more nodes configured to communicatively couple to two or more antennas; and
   an interface circuit, communicatively coupled to the two or more nodes, configured to communicate with a second electronic device, and configured to:
   receive samples of wireless signals in a time interval, wherein the wireless signals are associated with the second electronic device;
   compute a forward-backward moving-average covariance matrix based at least in part on the samples, wherein computing the forward-backward moving-average covariance matrix comprises computing a moving average in a forward time direction and computing a moving average in a backward time direction;
   determine eigenvectors based at least in part on the forward-backward moving-average covariance matrix, wherein the forward-backward moving average is used to extend a rank of the forward-backward moving-average covariance matrix when the rank is less than a number of the eigenvectors that are non-zero;
   calculate eigenfilters based at least in part on the eigenvectors;
   generate pseudospectra, based at least in part on the eigenvectors, for the eigenfilters, wherein the pseudospectra correspond to a set of times of arrival of the samples;
   for a given peak in the pseudospectra, determine an associated number of additional peaks within a temporal bin that includes the given peak, wherein the given peak is associated with one time of arrival of the samples of the set of times of arrival;
   select a subset of the peaks having a top-N number of additional peaks, wherein N is an integer; and
   select a lower time of arrival for the subset of the peaks.

2. The electronic device of claim 1, wherein the samples correspond to single instances of one or more multipath signals associated with a number of paths in a wireless environment of the electronic device.

3. The electronic device of claim 1, wherein the eigenvectors are computed based at least in part on an eigenvalue decomposition of the forward-backward moving-average covariance matrix.

4. The electronic device of claim 3, wherein a given pseudospectrum corresponds to a given eigenvector and is computed based at least in part on multiple signal classification (MUSIC) analysis of the given eigenvector.

5. The electronic device of claim 1, wherein the forward-backward moving-average covariance matrix is estimated.

6. The electronic device of claim 1, wherein the number of the eigenvectors that are non-zero is initially unknown.

7. The electronic device of claim 1, wherein the samples correspond to a number of instances of one or more multipath signals associated with a number of paths in a wireless environment of the electronic device that is less than the number of eigenvectors that are non-zero.

8. The computer-readable storage medium of claim 1, wherein the samples correspond to a number of instances of one or more multipath signals associated with a number of paths in a wireless environment of the electronic device that is less than the number of eigenvectors that are non-zero.

9. A non-transitory computer-readable storage medium for use in conjunction with an electronic device, the computer-readable storage medium storing program instructions that, when executed by processing circuitry included in the electronic device, cause the electronic device to select a lower time of arrival by carrying out one or more operations comprising:
receiving samples of wireless signals in a time interval, wherein the wireless signals are associated with the second electronic device;
computing a forward-backward moving-average covariance matrix based at least in part on the samples, wherein computing the forward-backward moving-average covariance matrix comprises computing a moving average in a forward time direction and computing a moving average in a backward time direction;
determining eigenvectors based at least in part on the forward-backward moving-average covariance matrix, wherein the forward-backward moving average is used to extend a rank of the forward-backward moving-average covariance matrix when the rank is less than a number of the eigenvectors that are non-zero;
calculating eigenfilters based at least in part on the eigenvectors;
generating pseudospectra, based at least in part on the eigenvectors, for the eigenfilters, wherein the pseudospectra correspond to a set of times of arrival of the samples;
for a given peak in the pseudospectra, determining an associated number of additional peaks within a temporal bin that includes the given peak, wherein the given peak is associated with one time of arrival of the samples of the set of times of arrival;
selecting a subset of the peaks having a top-N number of additional peaks, wherein N is an integer; and
performing maximum likelihood estimation based at least in part on the subset of the peaks to determine the time of arrival for the subset of the peaks.

10. The computer-readable storage medium of claim 9, wherein the samples correspond to single instances of one or more multipath signals associated with a number of paths in a wireless environment of the electronic device.

11. The computer-readable storage medium of claim 9, wherein the eigenvectors are computed based at least in part on an eigenvalue decomposition of the forward-backward moving-average covariance matrix.

12. The computer-readable storage medium of claim 11, wherein a given pseudospectrum corresponds to a given eigenvector and is computed based at least in part on multiple signal classification (MUSIC) analysis of the given eigenvector.

13. The computer-readable storage medium of claim 9, wherein the forward-backward moving-average covariance matrix is estimated.

14. The computer-readable storage medium of claim 9, wherein the number of the eigenvectors that are non-zero is initially unknown.

15. An electronic device, comprising:
two or more nodes configured to communicatively couple to two or more antennas; and
an interface circuit, communicatively coupled to the two or more nodes, configured to communicate with a second electronic device, and configured to determine a time of arrival of wireless signals associated with the second electronic device in a presence of M multipath signals, wherein M is a non-zero integer,
wherein the determining uses a single instance of the wireless signals and a covariance matrix associated with the wireless signals is underdetermined, and
wherein the covariance matrix is estimated by extending a manifold of samples of the wireless signals using a moving average in a forward time direction and a moving average in a backward time direction.

16. The electronic device of claim 15, wherein the determining reduces detection of a false time of arrival using multiple signal classification (MUSIC) analysis.

17. The electronic device of claim 15, wherein the computing eigenvectors using an eigenvalue decomposition of the covariance matrix.

18. The electronic device of claim 17, wherein the determining uses multiple signal classification (MUSIC) analysis of a given eigenvector.

19. The electronic device of claim 17, wherein the determining comprises computing eigenfilters based at least in part on the eigenvectors and generating pseudospectra, for the eigenfilters, based at least in part on the eigenvectors; and
wherein the pseudospectra correspond to a set of times of arrival of the wireless signals.

20. The electronic device of claim 15, wherein M is initially unknown.

* * * * *